US012573718B2

(12) United States Patent
Uchida et al.

(10) Patent No.: US 12,573,718 B2
(45) Date of Patent: Mar. 10, 2026

(54) SEPARATOR FOR ELECTRIC STORAGE DEVICE AND ELECTRIC STORAGE DEVICE

(71) Applicants:Celgard, LLC, Charlotte, NC (US); ASAHI KASEI KABUSHIKI KAISHA, Tokyo (JP)

(72) Inventors: Kazunori Uchida, Tokyo (JP); Shun Saito, Tokyo (JP); Hisashi Takeda, Düsseldorf (DE)

(73) Assignees: Celgard, LLC, Charlotte, NC (US); Asahi Kasei Kabushiki Kaisha, Tokyo (JP)

( * ) Notice: Subject to any disclaimer, the term of this patent is extended or adjusted under 35 U.S.C. 154(b) by 562 days.

(21) Appl. No.: 18/076,465

(22) Filed: Dec. 7, 2022

(65) Prior Publication Data

US 2023/0282938 A1     Sep. 7, 2023

Related U.S. Application Data

(60) Provisional application No. 63/286,578, filed on Dec. 7, 2021.

(51) Int. Cl.
| | |
|---|---|
| *H01M 50/449* | (2021.01) |
| *H01M 4/58* | (2010.01) |
| *H01M 50/417* | (2021.01) |
| *H01M 50/46* | (2021.01) |
| *H01M 50/489* | (2021.01) |
| *H01M 50/491* | (2021.01) |
| *H01M 50/494* | (2021.01) |

(52) U.S. Cl.
CPC ....... *H01M 50/449* (2021.01); *H01M 4/5825* (2013.01); *H01M 50/417* (2021.01); *H01M 50/46* (2021.01); *H01M 50/489* (2021.01); *H01M 50/491* (2021.01); *H01M 50/494* (2021.01)

(58) Field of Classification Search
CPC ............. H01M 50/449; H01M 4/5825; H01M 50/417; H01M 50/46; H01M 50/489; H01M 50/491; H01M 50/494; H01M 10/052; H01M 10/0525; H01M 50/426; H01M 50/44; H01M 50/446; H01M 50/451; H01M 50/457; H01M 50/414; Y02E 60/10
See application file for complete search history.

(56) References Cited

U.S. PATENT DOCUMENTS

| | | | |
|---|---|---|---|
| 2010/0248002 A1* | 9/2010 | Takita | H01M 10/0525 264/48 |
| 2020/0035969 A1* | 1/2020 | Kondo | B29C 55/04 |
| 2022/0166108 A1* | 5/2022 | Kim | H01M 50/426 |
| 2022/0181744 A1 | 6/2022 | Takahashi et al. | |

FOREIGN PATENT DOCUMENTS

| | | | |
|---|---|---|---|
| WO | WO2018089748 A1 | 5/2018 | |
| WO | WO2019/103947 | * | 5/2019 |

* cited by examiner

*Primary Examiner* — Lisa S Park
(74) *Attorney, Agent, or Firm* — J. Clinton Wimbish; Maynard Nexsen PC

(57) ABSTRACT

[Problem] To provide a separator for electric storage devices that suppresses dendrite short circuits and has excellent thermal stability.
[Solution] Provided is a separator for electric storage devices including: (A) a microporous layer mainly composed of (X) isotactic polypropylene; and (B) a microporous layer containing (Y) isotactic polypropylene identical or different from the isotactic polypropylene (X), and (Z) thermoplastic resin different from the isotactic polypropylene (Y). The microporous layer (B) has a lower isotactic polypropylene content than the microporous layer (A), and the thermoplastic resin (Z) has a tensile modulus of from 3 MPa to 500 MPa.

10 Claims, No Drawings

SEPARATOR FOR ELECTRIC STORAGE DEVICE AND ELECTRIC STORAGE DEVICE

FIELD

The present disclosure relates to a separator for electric storage devices and the like.

BACKGROUND

A microporous film, in particular, a polyolefin-based microporous film, is used in many technical fields such as a microfiltration film, a separator for batteries, a separator for capacitors, and a material for fuel cells, and in particular is used as a separator for electric storage devices such as lithium-ion batteries. Lithium-ion batteries are used in a variety of applications, such as small electronic devices, including cell phones and notebook personal computers, as well as electric vehicles, including hybrid vehicles and plug-in hybrid vehicles.

In recent years, lithium-ion batteries with high energy capacity, high energy density, and high output characteristics have been required, and this has increased demand for separators that are thin film and have excellent battery performance, battery reliability, and safety.

For example, Patent Literature 1 describes a multilayer microporous thin film or film that can improve characteristics including dielectric breakdown and strength. A preferable multilayer microporous film includes a microlayer and one or more layered barriers.

Patent Literature 2 describes a separator for electric storage devices containing a microporous film, the main component of which is polyolefin, having a melt tension of 30 mN or less when measured at a temperature of 230° C. and a melt flow rate (MFR) of 0.9 g/10 min or less when measured at a load of 2.16 kg and a temperature of 230° C.

CITATION LIST

Patent Literature

[PTL 1] WO 2018/089748
[PTL 2] WO 2020/196120

SUMMARY

Technical Problem

In electric storage devices, lithium dendrites generated during charging and discharging permeate and grow in a separator, causing a short circuit between a positive electrode and a negative electrode. As batteries become larger, there is a need for separators with excellent permeability and dimension stability, even after exposure to high temperatures.

Therefore, an object of the present disclosure is to provide a separator for electric storage devices that suppresses dendrite short circuits and has excellent thermal stability.

Solution to Problem

Examples of embodiments of the present disclosure are listed in items [1] to [9] below.
[1]
A separator for electric storage devices comprising:
(A) a microporous layer mainly composed of (X) isotactic polypropylene; and (B) a microporous layer containing (Y) isotactic polypropylene identical or different from the isotactic polypropylene (X), and (Z) thermoplastic resin different from the isotactic polypropylene (Y), wherein
the microporous layer (B) has a lower isotactic polypropylene content than the microporous layer (A), and the thermoplastic resin (Z) has a tensile modulus of from 3 MPa to 500 MPa.
[2]
The separator for electric storage devices according to Item 1, wherein the thermoplastic resin (Z) has a tensile modulus of from 10 MPa to 200 MPa.
[3]
The separator for electric storage devices according to item 1 or 2, wherein the composition forming the microporous layer (B) has a tensile breaking stress of from 14 MPa to 30 MPa.
[4]
The separator for electric storage devices of any one of Items 1 to 3, wherein the separator for electric storage devices, when converted to a thickness of 16 μm, has a permeability of from 50 sec/100 cm³ to 300 sec/100 cm³.
[5]
The separator for electric storage devices according to any one of Items 1 to 4, wherein an area-averaged long pore diameter of pores present in the microporous layer (B) in an ND-MD sectional observation of the microporous layer (B) is from 100 nm to 600 nm.
[6]
The separator for electric storage devices according to any one of Items 1 to 5, wherein the melt flow rate (MFR) of the microporous layer (A) is 0.9 g/10 min or less.
[7]
The separator for electric storage devices according to any one of Items 1 to 6, wherein at least one layer of the microporous layer (A) and at least one layer of the microporous layer (B) are adjacent to each other.
[8]
The separator for electric storage devices according to any one of Items 1 to 7, wherein the separator comprises the microporous layer (A) on the outermost layer of both sides thereof.
[9]
An electric storage device comprising a positive electrode, a negative electrode, and the separator for electric storage devices according to any one of Items 1 to 8 arranged between the positive electrode and the negative electrode.
[10]
The electric storage device according to Item 9, wherein the positive electrode contains lithium iron phosphate as a positive electrode active material.

Advantageous Effects of Invention

According to the present disclosure, a separator for electric storage devices which suppresses a dendrite short circuit and has excellent thermal stability is provided.

DESCRIPTION OF EMBODIMENTS

<<Separator for Electric Storage Devices>>
The separator for electric storage devices of the present disclosure comprises a separator substrate comprising: (A) a microporous layer mainly composed of (X) isotactic polypropylene; and (B) a microporous layer containing (Y) isotactic polypropylene, and (Z) thermoplastic resin different from the isotactic polypropylene (Y). The separator substrate may further comprise a coating layer (also referred to as "surface layer," "covering layer," or the like, and hereinafter, simply referred to as "coating layer") on the microporous layer (A) and/or the microporous layer (B). Herein. "microporous layer" means each microporous layer constituting a substrate of a separator, "separator substrate" means a base material of a separator excluding any coating layer, and "separator" means the entire separator including any coating layer.

<Microporous Layer (A)>

The separator for electric storage devices of the present disclosure comprises (A) a microporous layer. The separator for electric storage devices may comprise only one microporous layer (A) or two or more microporous layers (A). At least one of the microporous layers (A) preferably constitutes the outermost layer of at least one side of a separator substrate. When a separator for electric storage devices comprises two or more microporous layers (A), the microporous layers (A) may constitute the outermost layers of both sides of a separator substrate. The microporous layer (A) is mainly composed of isotactic polypropylene (X), which can maintain a favorable battery performance even after storage at high temperatures (for example, 130° C.). Herein, "mainly composed of" isotactic polypropylene (X) means containing 50 wt % or more of isotactic polypropylene (X), based on the total weight of the microporous layer (A). The lower limit of the content of isotactic polypropylene (X) in the microporous layer (A) is 50 wt % or more, preferably 55 wt % or more, 60 wt % or more, 70 wt % or more, 80 wt % or more, 90 wt % or more, or 95 wt % or more, from the viewpoint of wettability, thinning, and shutdown characteristics, and the like, of a separator. The upper limit of the content of isotactic polypropylene (X) in the microporous layer (A) is not limited, but may be, for example, 60 wt % or less, 70 wt % or less, 80 wt % or less, 90 wt % or less, 95 wt % or less, 98 wt % or less, or 99 wt % or less, and may be 100 wt %.

<Material of Microporous Layer (A)>

The microporous layer (A) is mainly composed of isotactic polypropylene (X). The isotactic polypropylene (X) of the microporous layer (A) may be the same material as the isotactic polypropylene (Y) of the microporous layer (B) described below, or may be a polypropylene with a different chemical structure, more specifically, a polypropylene in which at least one of the monomer composition, the stereoregularity, the molecular weight, the crystal structure, and the like is different.

Isotactic polypropylene is a polypropylene with a pentad fraction of 60% or more. Since isotactic polypropylene is a highly crystalline polymer, it is easy to open holes in a dry stretch opening method to obtain a separator with high permeability.

The weight average molecular weight (Mw) of isotactic polypropylene (X) in the microporous layer (A) is preferably 300,000 or more from the viewpoint of strength or the like of the microporous layer and dendrite suppression, and preferably 1,300,000 or less from the viewpoint of ensuring favorable film formability and productivity. The Mw of isotactic polypropylene (X) is more preferably from 500,000 to 1,200,000, more preferably from 650,000 to 1,100,000, more preferably from 750,000 to 1,000,000, and particularly preferably from 800,000 to 1,000,000.

The value (Mw/Mn) obtained by dividing the weight average molecular weight (Mw) of isotactic polypropylene (X) in the microporous layer (A) by the number average molecular weight (Mn) is preferably 20 or less, and more preferably 18 or less, 16 or less, 14 or less, or 12 or less. By setting Mw/Mn to 20 or less, favorable film formability and productivity tend to be ensured. Mw/Mn is preferably 3 or more, and more preferably 4 or more, 4.5 or more, or 5.0 or more. The larger the value of Mw/Mn of isotactic polypropylene (X), the larger the melt tension of a microporous layer obtained tends to be. It is preferable to increase the melt tension of the microporous layer (A) in suppressing dendrites. Therefore, it is preferable for the value of Mw/Mn of isotactic polypropylene (X) to be 3 or more to control the melt tension of the microporous layer (A) at a high level. The weight average molecular weight, the number average molecular weight, and Mw/Mn of the polyolefin of the present disclosure are values determined from molecular weights in terms of polystyrene obtained by GPC (gel permeation chromatography) measurement.

The density of isotactic polypropylene (X) in the microporous layer (A) is preferably 0.85 g/cm$^3$ or higher, for example, 0.88 g/cm$^3$ or higher, 0.89 g/cm$^3$ or higher, or 0.90 g/cm$^3$ or higher. The density of polypropylene is preferably 1.1 g/cm$^3$ or less, for example, 1.0 g/cm$^3$ or less, 0.98 g/cm3 or less, 0.97 g/cm3 or less, 0.96 g/cm3 or less, 0.95 g/cm3 or less, 0.94 g/cm3 or less, 0.93 g/cm$^3$ or less, or 0.92 g/cm$^3$ or less. The density of polyolefin is related to the crystallinity of polypropylene, and a density of 0.85 g/cm$^3$ or higher for isotactic polypropylene (X) improves the productivity of microporous layers, which is particularly advantageous in the dry method.

<Melt Flow Rate (MFR) of Microporous Layer (A)>

The upper limit of the melt flow rate (MFR) (MFR of a single layer) of the microporous layer (A) is, from the viewpoint of obtaining a microporous layer (A) with higher strength and from the viewpoint of suppressing dendrite short circuit, preferably 1.0 g/10 min or less, and may be, for example, 0.9 g/10 min or less, 0.8 g/10 min or less, 0.7 g/10 min or less, 0.6 g/10 min or less, or 0.5 g/10 min or less. The lower limit of MFR (single layer MFR) of the microporous layer (A) is not limited from the viewpoint of formability of the microporous layer (A), or the like, and may be 0.2 g/10 min or more, 0.25 g/10 min or more, 0.3 g/10 min or more, or 0.35 g/10 min or more. The MFR of the microporous layer (A) is measured under a load of 2.16 kg and a temperature of 230° C.

That the MFR of the microporous layer (A) is 0.9 g/10 min or less means that the molecular weight of the polyolefin in the microporous layer (A) is somewhat high. When a polyolefin has a high molecular weight, the number of tie molecules that bind the crystallites together increases, which tends to produce the microporous layer (A) with high strength and also tends to provide a sufficiently high melt tension to achieve a pore structure that suppresses dendrite short circuits. An MFR of the microporous layer (A) of 0.2 g/10 min or more prevents the melt tension of the microporous layer (A) from becoming too high, thereby ensuring favorable film formability and productivity.

The MFR of isotactic polypropylene (X) in the microporous layer (A) is, from the viewpoint of obtaining a microporous layer (A) with high strength and high melt tension, preferably from 0.2 to 4.0 g/10 min when measured under a load of 2.16 kg and a temperature of 230° C. The upper limit of MFR of isotactic polypropylene (X) may, from the viewpoint of obtaining a microporous layer with higher strength, be, for example, 4.0 g/10 min or less, 3.0 g/10 min or less, 2.0 g/10 min or less, 1.5 g/10 min or less, 1.1 g/10 min or less, or 0.5 g/10 min or less. The lower limit of MFR of isotactic polypropylene (X) is not limited, and may, from the viewpoint of formability of the microporous layer (A), be, for example, 0.2 g/10 min or more, 0.25 g/10 min or more, 0.3 g/10 min or more, 0.35 g/10 min or more, or 0.35 g/10 min or more.

<Pentad Fraction of Isotactic Polypropylene (X) in Microporous Layer (A)>

The lower limit of the pentad fraction of isotactic polypropylene (X) in the microporous layer (A) may, from the viewpoint of obtaining a microporous layer with low permeability, preferably be 60.0% or higher, for example, 80.0% or higher, 90.0% or higher, 95.0% or higher, 98.0% or higher, 98.5% or higher, or 99.0% or higher. The upper limit of the pentad fraction of isotactic polypropylene (X) is not limited, and may be 99.9% or less, 99.8% or less, or 99.5% or less. The pentad fraction of isotactic polypropylene (X) is measured by $^{13}$C-NMR (nuclear magnetic resonance method).

A pentad fraction of isotactic polypropylene (X) of 60% or more indicates that the crystallinity of isotactic polypropylene (X) is high. A separator obtained by the stretch opening method, in particular the dry method, opens pores by stretching amorphous portions between crystallites, and therefore, when the crystallinity of isotactic polypropylene (X) is high, the porosity is favorable and the permeability can also be kept low, which enables high output of a battery.

<Area-Averaged Long Pore Diameter of Microporous Layer (A)>

The area-averaged long pore diameter in an ND-MD section of the microporous layer (A) (hereinafter, also simply referred to as "area-averaged long pore diameter") is preferably from 50 nm to 400 nm. Herein, "ND" indicates the direction of thickness of a microporous layer, and "MD" indicates the direction of film formation of a microporous layer. For example, the MD of a separator containing a microporous layer is the longitudinal direction when the separator is a roll. The "long pore diameter" means the pore diameter in the MD. When the number of microporous layers (A) and/or microporous layers (B) is more than two, the area-averaged long pore diameters of the microporous layer (A) and the microporous layer (B) are compared based on the average area-averaged long pore diameter value of the respective layers. The lower limit of the area-averaged long pore diameter of the microporous layer (A), from the viewpoint of ensuring favorable output in an electric storage device, is preferably 50 nm or more, more preferably 80 nm or more, still more preferably 110 nm or more, particularly preferably 120 nm or more, and most preferably 130 nm or more. The upper limit of the area-averaged long pore diameter of the microporous layer (A), from the viewpoint of favorable dendrite short circuit suppression, is preferably 400 nm or less, more preferably 350 nm or less, still more preferably 300 nm or less, particularly preferably 250 nm or less, and most preferably 210 nm or less.

The area-averaged long pore diameter can be measured by sectional SEM observation of an ND-MD section of a separator and image analysis in the range of 20 μm MD×3 μm ND from an obtained image. Detailed conditions are given in Examples. When measuring the average pore diameter from a sectional SEM image, the number-averaged pore diameter and the area-averaged long pore diameter can be calculated, and in order to better correlate with the physical properties of a separator, the area-averaged long pore diameter is used as the average pore diameter herein.

<Porosity of Microporous Layer (A)>

The porosity of the microporous layer (A) is preferably 20% or more from the viewpoint of avoiding clogging in an electric storage device and obtaining favorable permeability of a separator, and is preferably 70% or less from the viewpoint of maintaining the strength of the separator. The porosity of the microporous layer (A) is more preferably from 25% to 65%, further preferably from 30% to 60%, and particularly preferably from 35% to 60%.

<Thickness of Microporous Layer (A)>

The thickness of the microporous layer (A), from the viewpoint of high energy density of an electric storage device and the like, may preferably be 10 μm or less, for example, 8 μm or less, 7 μm or less, 6 μm or less, 5 μm or less, 4.5 μm or less, or 4 μm or less. The lower limit of the thickness of the microporous layer (A), from the viewpoint of strength and the like, may preferably be 1 μm or more, for example, 2 μm or more, 3 μm or more, or 3.5 μm or more.

<Additive of Microporous Layer (A)>

The microporous layer (A), which is mainly composed of isotactic polypropylene (X), may further contain an additive such as an elastomer, a crystal nucleating agent, an antioxidant, or a filler, if necessary, in addition to isotactic polypropylene (X). The amount of an additive is not particularly limited, and may be, based on the total weight of the microporous layer (A), for example, from 0.01 wt %, 0.1 wt %, or 1 wt % to 20 wt % or less, 10 wt % or less, or 7 wt % or less. When the amount of an additive is 20% or less, high crystallinity and crystal orientation of isotactic polypropylene (X) can be obtained, and favorable porosity can be achieved in a separator obtained by a stretch opening method, in particular, a dry method, and the permeability can be suppressed to a low level, thereby enabling high power output of a battery.

<Microporous Layer (B)>

The separator for electric storage devices of the present disclosure contains the microporous layer (B) with a smaller ratio of isotactic polypropylene than the microporous layer (A) containing the microporous layer (B). The separator for electric storage devices may comprise only one microporous layer (B) or two or more microporous layers (B). The microporous layer (B) also preferably mainly composed of isotactic polypropylene (Y). This can maintain a favorable battery performance even after storage at high temperatures (for example, 130° C.). Herein, "composed mainly of" isotactic polypropylene (Y) means that the microporous layer (B) contains more than 50 wt % of isotactic polypropylene (Y), based on the total weight of the microporous layer (B). The lower limit of the content of isotactic polypropylene (Y) in the microporous layer (B) may be preferably 55 wt % or more, 60 wt % or more, 70 wt % or more, 80 wt % or more, or 85 wt % or more, from the viewpoint of wettability, thinning, and the like, of a separator. The upper limit of the content of isotactic polypropylene (Y) in the microporous layer (B) is not limited, but may be, for example, 60 wt % or less, 70 wt % or less, 80 wt % or less, 90 wt % or less, or 96 wt % or less, and may be 100 wt %.

<Material of Microporous Layer (B)>

The microporous layer (B) is a resin composition containing isotactic polypropylene (Y) and thermoplastic resin (Z) different from the isotactic polypropylene (Y). The isotactic polypropylene (Y) of the microporous layer (B) may be the same material as the isotactic polypropylene (X) of the microporous layer (A), or may be a polypropylene with a different chemical structure, more specifically, a polypropylene in which at least one of the monomer composition, the stereo-regularity, the molecular weight, the crystal structure, and the like is different.

The weight average molecular weight (Mw) of isotactic polypropylene (Y) in the microporous layer (B) is preferably 250,000 or more from the viewpoint of strength or the like of the microporous layer, and preferably 1,000,000 or less from the viewpoint of increasing the pore diameter of the microporous layer and developing favorable dendrite suppression performance. The Mw of isotactic polypropylene (Y) is more preferably from 400,000 to 950,000, more preferably from 550,000 to 900,000, more preferably from 600,000 to 900.000, and particularly preferably from 700,000 to 900,000.

The upper limit of the value (Mw/Mn) obtained by dividing the weight average molecular weight (Mw) of isotactic polypropylene (Y) in the microporous layer (B) by the number average molecular weight (Mn) is preferably 7 or less, and more preferably 6.5 or less, 6 or less, 5.5 or less, or 5 or less. The smaller the value of Mw/Mn of isotactic polypropylene (Y), the smaller the melt tension of a microporous layer obtained tends to be. Therefore, it is preferable for the value of Mw/Mn of isotactic polypropylene (Y) to be 7 or less to control the melt tension of the microporous layer (B) at a low level. Mw/Mn may preferably be 1 or more, for example, 1.3 or more, 1.5 or more, 2.0 or more, or 2.5 or more. When Mw/Mn is 1 or more, an appropriate molecular entanglement may be maintained, resulting in favorable stability during film formation. The weight average molecular weight, the number average molecular weight, and Mw/Mn of the polyolefin of the present disclosure are obtained from molecular weights in terms of polystyrene obtained by GPC (gel permeation chromatography) measurement.

The density of isotactic polypropylene (Y) in the microporous layer (B) is preferably 0.85 g/cm$^3$ or higher, for example, 0.88 g/cm$^3$ or higher, 0.89 g/cm$^3$ or higher, or 0.90 g/cm$^3$ or higher. The density of isotactic polypropylene (Y) is preferably 1.1 g/cm$^3$ or less, for example, 1.0 g/cm$^3$ or less, 0.98 g/cm$^3$ or less, 0.97 g/cm$^3$ or less, 0.96 g/cm$^3$ or less, 0.95 g/cm$^3$ or less, 0.94 g/cm$^3$ or less, 0.93 g/cm$^3$ or less, or 0.92 g/cm$^3$ or less. The density of polyolefin is related to the crystallinity of polypropylene, and a density of 0.85 g/cm$^3$ or higher for isotactic polypropylene (Y) improves the productivity of microporous layers, which is particularly advantageous in the dry method.

Thermoplastic resin (Z) contained in the microporous layer (B) is a thermoplastic resin other than isotactic polypropylene (Y). The tensile modulus of thermoplastic resin (Z) is a value measured after the thermoplastic resin (Z) is melt-kneaded and a tensile test piece JIS K 7161-2 is prepared by injection molding. The tensile modulus of thermoplastic resin (Z) is 500 MPa or less, preferably 200 MPa or less, more preferably 150 MPa or less, and more preferably 100 MPa or less. The lower limit is 3 MPa or more, preferably 10 MPa or more, more preferably 15 MPa or more, and particularly preferably 20 MPa or more.

By using a dry stretch opening method, in which thermoplastic resin (Z) with a tensile modulus of 500 MPa or less is present, and by heat treating (annealing) at a high temperature close to the melting point of polypropylene, a microporous layer with a larger pore diameter and high permeability can be easily obtained. Since the pore diameter can be controlled to be sufficiently large, dendrite short circuits in electric storage devices can be effectively suppressed. Even if thermoplastic resin (Z) below 500 MPa is present, when the temperature of thermal treatment is low, sufficient opening of pores is not possible, and it is difficult to achieve high permeability and large pore diameter. In the case of a separator substrate with a polyethylene layer, it is difficult to obtain high permeability because the polyethylene melts and blocks pores in the separator substrate.

Thermoplastic resin (Z) in the microporous layer (B) can be one type or two or more types, and in the case of two or more types, the tensile modulus is measured by preparing a tensile test piece made of a thermoplastic resin mixed at the addition ratio of the thermoplastic resin.

The tensile modulus of the thermoplastic resin (Z) contained in the microporous layer (B) was measured as follows when taken out of the microporous layer (B). In other words, a separator substrate or the microporous layer (B) peeled therefrom was melt-kneaded with a solvent such as octane, methylene chloride, or toluene after the thermoplastic resin was extracted, and a tensile test piece JIS K 7161-2 was prepared by injection molding and used for measurement.

Examples of the thermoplastic resin (Z) include a polyolefin other than isotactic polypropylene (also referred to as "another polyolefin"), and a copolymer of polystyrene and a polyolefin. Examples of polypropylene include low crystallinity polypropylene with a low stereo-regularity region. A polyolefin is a polymer that contains a monomer containing a carbon-carbon double bond as a repeating unit. Examples of the monomer constituting a polyolefin other than polypropylene include, without limitation, a monomer having 2 or 4 to 10 carbon atoms containing a carbon-carbon double bond, such as ethylene, 1-butene, 4-methyl-1-pentene, 1-hexene, and 1-octene. Polyolefin is, for example, a homopolymer, a copolymer, or a multi-step polymerization polymer, and, for example, can also contain polyethylene.

Preferable examples of a copolymer of polystyrene and a polyolefin include styrene-(ethylene-propylene)-styrene copolymer (SEPS), styrene-(ethylene-butene)-styrene copolymer, styrene-ethylene-styrene copolymer, olefin crystal-(ethylene-butene)-olefin crystal copolymer (CEBC), and styrene-(ethylene-butene)-olefin crystal copolymer (SEBC). Particularly preferable is styrene-(ethylene-propylene)-styrene copolymer (SEPS).

Since a polymer with a double bond in the molecule, such as a block copolymer composed of styrene and butadiene, is undesirable from the viewpoint of stability in a battery, a polymer in which a double bond portion is hydrogenated is preferable. Specific examples thereof include styrene-(ethylene-butene)-styrene copolymer (hydrogenated SEBS).

The amount of thermoplastic resin (Z) added, based on the total weight of the microporous layer (B), is preferably from 1 wt %, 3 wt %, or 4 wt % to 20 wt % or less, 15 wt %, or 12 wt % or less. When the amount is 1 wt % or more, by using a dry stretch opening method in pore formation at the time of pore opening, the pore size per pore after stretching and expansion can be increased. The large pore size can effectively suppress dendrite short circuits in electric storage devices. When the amount is 20 wt % or less and annealing is further performed at a high temperature close to that of polypropylene, it is easy to obtain high crystallinity and high crystal orientation of polypropylene, and in a separator obtained by a stretch opening method, in particular, a dry method, the porosity is favorable and the permeability can be kept low, which enables high output of a battery.

The MFR of the thermoplastic resin (Z) is preferably 0.05 or more, 1.0 or more, or 3.0 or more, and 200 or less, 120 or less, or 80 or less. When the MFR is from 1.0 to 200, the MFR difference from polypropylene is reduced, enabling uniform mixing during melt-kneading, thereby obtaining a separator with high uniformity in thickness, permeability, and strength.

<Melt Flow Rate (MFR) of Microporous Layer (B)>

The upper limit of the melt flow rate (MFR) (MFR of a single layer) of the microporous layer (B) is, from the viewpoint of obtaining a microporous layer (B) with higher strength, preferably 8.0 g/10 min or less, and may be, for example, 6.0 g/10 min or less, 4.0 g/10 min or less, 3.0 g/10 min or less, 2.0 g/10 min or less, or 1.1 g/10 min or less. The lower limit of MFR (single layer MFR) of the microporous layer (B) is not limited from the viewpoint of favorable dendrite suppression effect, and may be 0.3 g/10 min or more, 0.35 g/10 min or more, 0.4 g/10 min or more, 0.45 g/10 min or more, or 0.5 g/10 min or more. The MFR of the microporous layer (B) is measured under a load of 2.16 kg and a temperature of 230° C.

That the MFR of the microporous layer (B) is 8.0 g/10 min or less means that the molecular weight of isotactic polypropylene (Y) in the microporous layer (B) is somewhat high. When isotactic polypropylene (Y) has a high molecular weight, the number of tie molecules that bind the crystallites together increases, which tends to produce the microporous layer (B) with high strength. An MFR of the microporous layer (B) of 0.3 g/10 min or more prevents the melt tension of the microporous layer (B) from becoming too high, thereby making it easier to obtain a separator that exhibits a favorable dendrite suppression effect.

The MFR of isotactic polypropylene (Y) of the microporous layer (B) is, from the viewpoint of obtaining the microporous layer (B) with higher strength, preferably 8.0 g/10 min or less, and may be, for example, 6.0 g/10 min or less, 4.0 g/10 min or less, 3.0 g/10 min or less, 2.0 g/10 min or less, or 1.1 g/10 min or less. The lower limit of MFR (MFR of a single layer) of the microporous layer (B) is not limited from the viewpoint of favorable dendrite suppression, and may be, for example, 0.3 g/10 min or more, 0.35 g/10 min or more, 0.4 g/10 min or more, 0.45 g/10 min or more, or 0.5 g/10 min or more.

<Pentad Fraction of Isotactic Polypropylene (Y) in Microporous Layer (B)>

The lower limit of the pentad fraction of isotactic polypropylene (Y) in the microporous layer (B) may, from the viewpoint of obtaining a microporous layer with low permeability, preferably be 60.0% or higher, for example, 80.0% or higher, 90.0% or higher, 95.0% or higher, 98.0% or higher, or 99.0% or higher. The upper limit of the pentad fraction of isotactic polypropylene (Y) is not limited, and may be 99.9% or less, 99.8% or less, or 99.5% or less. The pentad fraction of isotactic polypropylene (Y) is measured by $^{13}$C-NMR (nuclear magnetic resonance method).

A pentad fraction of isotactic polypropylene (Y) of 60.0% or more indicates that the crystallinity of isotactic polypropylene (Y) is high. A separator obtained by the stretch opening method, in particular the dry method, opens pores by stretching amorphous portions between crystallites, and therefore, when the crystallinity of isotactic polypropylene (Y) is high, the porosity is favorable and the permeability can also be kept low, which enables high output of a battery.

<Tensile Breaking Stress of Microporous Layer (B)>

The tensile breaking stress of the microporous layer (B) is a value measured when a resin composition of the microporous layer (B) is melt-kneaded, and then a stress is applied in the tensile direction to a molded body formed by injection molding a tensile test piece JIS K 7161-2. A measured value of tensile breaking stress is different from a measured value of a separator with a pore structure or a film of resin composition oriented in MD. The tensile breaking stress of the resin composition of the microporous layer (B) is preferably 30 MPa or less, 28 MPa or less, or 25 MPa or less. The lower limit is preferably 14 MPa or more, 16 MPa, or 18 MPa or more. By setting the tensile breaking stress of the resin composition of the microporous layer (B) to 30 MPa or less and further thermally treating the resin composition at a high temperature close to the melting point of polypropylene, a microporous layer with a larger pore diameter and higher permeability is easily obtained. The pore size per pore after stretching and expansion can be increased, effectively suppressing dendrite short-circuits in electric storage devices.

<Area-averaged Long Pore Diameter of Microporous Layer (B)>

The area-averaged long pore diameter (hereinafter, also simply referred to as "area-averaged long pore diameter") in the ND-MD cross-section of the microporous layer (B) is preferably larger than the area-averaged long pore diameter of the microporous layer (A). For details on the relationship with the area-averaged long pore diameter of the microporous layer (A), refer to the "Area-averaged Long Pore Diameter of Microporous Layer (A)" section.

The area-averaged long pore diameter in the ND-MD section of the microporous layer (B) is preferably from 100 nm to 600 nm, more preferably from 120 nm to 500 nm, further preferably from 140 nm to 400 nm, and still further preferably from 160 nm to 350 nm. When the area-averaged long pore diameter of the microporous layer (B) is within this range, dendrite short circuits can be suppressed more effectively.

<Porosity of Microporous Layer (B)>

The porosity of the microporous layer (B) is preferably 20% or more from the viewpoint of avoiding clogging in an electric storage device and obtaining favorable permeability of a separator, and is preferably 70% or less from the viewpoint of maintaining the strength of the separator. The porosity of the microporous layer (B) is more preferably from 25% to 65%, further preferably from 30% to 60%, and particularly preferably from 35% to 60%.

<Thickness of Microporous Layer (B)>

The thickness of the microporous layer (B) of the present disclosure, from the viewpoint of high energy density of an electric storage device and the like, may preferably be 10 μm or less, for example, 8 μm or less, 7 μm or less, 6 μm or less, 5 μm or less, 4.5 μm or less, or 4 μm or less. The lower limit of the thickness of the microporous layer (B), from the viewpoint of strength and the like, may preferably be 1 μm or more, for example, 2 μm or more, 3 μm or more, or 3.5 μm or more.

The ratio $L_B/L_A$ of the area-averaged long pore diameter $L_B$ of the microporous layer (B) to the area-averaged long pore diameter $L_A$ of the microporous layer (A) is preferably from 1.1 to 6.0. By setting the $L_B/L_A$ to 1.1 or more, the pore diameter of the microporous layer (A) is sufficiently small and the pore diameter of the microporous layer (B) is sufficiently large, and dendrite short circuits in an electric storage device can be effectively suppressed. By setting the $LB/L_A$ to 6 or less, a separator with favorable porosity and permeability can be obtained. $L_B/L_A$ is preferably from 1.1 to 4.0, more preferably from 1.15 to 3.0, especially from 1.2 to 2.5, and most preferably from 1.3 to 2.0.

<Layer Structure of Separator Substrate>

The separator base material (herein, also simply referred to as "separator substrate") for electric storage devices is composed of at least one layer of the microporous layer (A) and at least one layer of the microporous layer (B). The separator substrate may have a multilayer structure of three or more layers in which at least one of the microporous layer (A) and/or the microporous layer (B) has two or more layers. Examples of the multilayer structure include a two-layer structure of microporous layer (A)/microporous layer (B) and a three-layer structure of microporous layer (A)/microporous layer (B)/microporous layer (A). The separator substrate may include a layer other than the microporous layer (A) and the microporous layer (B). Examples of the layer other than the microporous layer (A) and the microporous layer (B) include a microporous layer mainly composed of polyolefin other than (A) and (B), a layer containing an inorganic material, and a layer containing a heat-resistant resin. For example, the separator substrate may have a multilayer structure with four or more layers, such as microporous layer (A)/microporous layer (B)/microporous layer (C)/microporous layer (A). From the viewpoint of ease of manufacturing, suppression of separator curling, and the like, a symmetrical multilayer structure is preferable.

As for the layer structure of the separator substrate for electric storage devices, it is preferable that at least one layer of the microporous layer (A) and at least one layer of the microporous layer (B) are adjacent to each other from the viewpoint of effectively suppressing dendrite short circuits. It is more preferable that the microporous layer (A) constitutes the outermost layer on at least one side of the separator substrate, and it is particularly preferable that the microporous layer (A) constitutes the outermost layer on both sides of the separator substrate. When the microporous layer (A) constitutes the outermost layer, dendrite short circuits tend to be easily suppressed.

<Thickness of Separator Substrate>

The upper limit of the thickness of the separator substrate is, from the viewpoint of high energy density of an electric storage device, and the like, preferably 25 μm or less, and may be, for example, 22 μm or less, 20 μm or less, 18 μm or less, 16 μm or less, 14 μm or less, or 12 μm or less. The lower limit of the thickness of the separator substrate is, from the viewpoint of strength, and the like, preferably 6 μm or more, and may be, for example, 7 μm or more, 8 μm or more, 9 μm or more, or 10 μm or more.

<Permeability (Air Permeability) of Separator Substrate>

The upper limit of the permeability of a separator substrate, when the thickness of the separator substrate is converted to 16 μm, is preferably 300 sec/100 cm³ or less, and for example, 290 sec/100 cm³ or less, 280 sec/100 cm³ or less, 270 sec/100 cm³ or less, 260 sec/100 cm³ or less, or 250 sec/100 cm³ or less. The lower limit of the permeability of a separator substrate, when the thickness of the separator substrate is converted to 16 μm, is not limited, but may be, for example, 50 sec/100 cm³ or more, 60 sec/100 cm³ or more, or 70 sec/100 cm³ or more.

<Porosity of Separator Substrate>

The porosity of a separator substrate is preferably 20% or more from the viewpoint of avoiding clogging in an electric storage device and obtaining favorable permeability of a separator, and is preferably 70% or less from the viewpoint of maintaining the strength of the separator. The porosity of a separator substrate is more preferably from 25% to 65%, more preferably from 30% to 60%, and particularly preferably from 35% to 60%.

<Puncture Strength of Separator Substrate>

The lower limit of the puncture strength of a separator substrate in terms of 16 μm thickness is preferably 260 gf or more, more preferably 270 gf or more, 280 gf or more, 290 gf or more, or 300 gf or more, and particularly preferably 320 gf or more. The upper limit of the puncture strength of a separator substrate is not limited, but may, when converting the thickness of the separator substrate to 16 μm, preferably be 600 gf or less, for example, 580 gf or less, or 550 gf or less.

<Thermal Shrinkage Rate of Separator Substrate>

A separator substrate preferably has a thermal shrinkage rate in the width direction (TD) of from −1.0% to 3.0% after heat treatment at 150° C. for 1 hour. This means that the separator substrate has very little thermal shrinkage in the TD even at high temperatures. When the thermal shrinkage rate is 3.0% or less, short circuits can be effectively suppressed at high temperatures. The reason why the thermal shrinkage rate is −1.0% or higher is that the substrate expands in the TD when the thermal shrinkage rate is measured, and the thermal shrinkage rate may become a negative value smaller than 0%. The thermal shrinkage rate may be 0% or higher, or higher than 0%. Examples of a method for manufacturing a separator substrate whose thermal shrinkage rate is from −1.0% to 3.0% include a method for manufacturing a separator by uniaxial stretching of MD, and preferably a method for manufacturing a separator by dry method of uniaxial stretching. In the method for manufacturing a separator by stretching in MD and TD biaxial directions as represented by a wet separator, the thermal shrinkage of TD is generally very large, whereas in the dry separator of uniaxial stretching, a separator substrate with a thermal shrinkage rate of from −1.0% to 3.0% can be easily obtained.

<<Method for Manufacturing Separator for Electric Storage Devices>>

A method for manufacturing a separator for electric storage devices includes: a melt-extrusion process for melting and extruding a resin composition (hereinafter, also referred to as "polypropylene resin composition") mainly composed of polypropylene to obtain a resin sheet (precursor sheet); and a pore-forming process in which the resulting precursor sheet is made porous by opening holes in the sheet. The method for manufacturing a microporous layer can be broadly classified into a dry method that does not use solvents in a pore-forming process and a wet method that uses a solvent.

Examples of the dry method include a method in which a polypropylene resin composition is melt-kneaded and extruded, and then a polypropylene crystal interface is exfoliated by heat treatment and stretching, or a method in which a polypropylene resin composition and an inorganic filler are melt-kneaded and molded into a film shape, and then an interface between the polypropylene and the inorganic filler is exfoliated by stretching.

Examples of the wet method include a method in which a polypropylene resin composition and a pore-forming material are melt-kneaded and molded into a film shape, stretched if necessary, and then the pore-forming material is extracted, and a method in which a polypropylene resin composition is dissolved and then immersed in a poor solvent for polypropylene to solidify the polypropylene and remove the solvent at the same time.

For melt kneading of a polypropylene resin composition, a single screw extruder and a twin screw extruder can be used, and in addition to these, for example, a kneader, a lab-plast mill, kneading rolls, and a Banbury mixer can also be used.

A polypropylene resin composition may optionally contain a resin other than polypropylene, an additive, and the like, depending on the manufacturing method of a microporous layer, or depending on the physical properties of a desired microporous layer. Examples of the additive include a pore-forming material, a fluorinated flow modifier, a wax, a crystal nucleus material, an antioxidant, a metal soap such as aliphatic carboxylic acid metal salt, a UV absorber, a light stabilizer, an antistatic agent, an antifogging agent, and a colored pigment. Examples of the pore-forming material include a plasticizer, an inorganic filler, or a combination thereof.

Examples of the plasticizer include a hydrocarbon such as liquid paraffin or paraffin wax; an ester such as dioctyl phthalate or dibutyl phthalate; and a higher alcohol such as oleyl alcohol or stearyl alcohol.

Examples of the inorganic filler include: oxide ceramics such as alumina, silica (silicon oxide), titania, zirconia, magnesia, ceria, yttria, zinc oxide, or iron oxide; nitride ceramics such as silicon nitride, titanium nitride, and boron nitride; ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomaceous earth, silica sand; and glass fiber.

As the manufacturing method for a separator substrate, a dry lamellar crystal pore opening process, in which a polypropylene crystal interface is exfoliated by heat treatment and stretching, is preferable. Here, as the method for manufacturing a separator substrate composed of the microporous layer (A) and the microporous layer (B), at least one of the following methods (i) and (ii) is preferably used:

(i) a method for manufacturing a separator substrate by co-extrusion film formation, wherein the microporous layer (A) and the microporous layer (B) are co-extruded and subjected to an annealing process, a cold stretching process, a thermal stretching process, and a thermal relaxation process; and
  (ii) a method for manufacturing a separator substrate by lamination, wherein the microporous layer (A) and the microporous layer (B) are extruded separately, laminated together by lamination, and then subjected to an annealing process, a cold stretching process, a thermal stretching process, and a thermal relaxation process.

Of the co-extrusion process (i) and lamination process (ii), the co-extrusion process (i) is preferable from the viewpoint of manufacturing cost and the like. In the co-extrusion process (i), for the extrusion film formation conditions of the microporous layers (A) and (B), it is preferable to discharge a resin at the lowest possible temperature and to quench the resin effectively by blowing low-temperature air. After film formation, quenching by air is preferable, and the temperature of air to be blown is preferably 20° C. or lower, and more preferably 15° C. or lower. By blowing cold air controlled at such a low temperature, the resin after film formation is uniformly oriented to MD.

In both the co-extrusion process (i) and lamination process (ii), the method for manufacturing the separator substrate may include an annealing process after extrusion film formation. The annealing process tends to grow the crystal structure of the microporous layers (A) and (B) and improve the porosity. Annealing at a specific temperature for a predetermined time tends to enable both the microporous layers (A) and (B) to have a favorable area-averaged long pore diameter. The reason for this is thought to be because a crystal grows without disrupting the crystal structure and high porosity is obtained. In the annealing process, it is preferable that an annealing treatment is performed in the temperature range of preferably from 115° C. to 160° C. for preferably 20 minutes or more, more preferably 60 minutes or more, from the viewpoint of obtaining a favorable area-averaged long pore diameter and maintaining high output of an electric storage device, while also expressing dendrite suppression effect.

The method for manufacturing a separator substrate may include a stretching process after the annealing process. Either uniaxial or biaxial stretching may be used as the stretching process. Although not limited, uniaxial stretching is preferable from the viewpoints of manufacturing cost and reduction of thermal shrinkage of TD when a dry method is used. Biaxial stretching is preferable from the viewpoint of improving the strength of a resulting separator substrate. Examples of the biaxial stretching include a simultaneous biaxial stretching method, a sequential biaxial stretching method, a multi-stage stretching method, and a multiple stretching method.

In order to control thermal shrinkage of a separator substrate, a thermal treatment process may be performed for the purpose of thermal fixation after a stretching process or after a pore-forming process. The heat treatment process may include a stretching operation performed at a predetermined temperature and a predetermined drawing ratio for the purpose of adjusting physical properties, and/or a relaxation operation performed at a predetermined temperature and a predetermined relaxation ratio for the purpose of reducing shrinkage stress applied during film forming and stretching. The relaxation operation may be performed after the stretching operation is performed. These thermal treatment processes may be performed using a tenter or a roll stretching machine.

The resulting separator substrate may be used as it is as a separator for electric storage devices. Optionally, a further layer such as a coating layer may be provided on one or both sides of the separator substrate, and a surface treatment such as corona treatment may be applied as necessary.

<<Electric Storage Device>>

The electric storage device of the present disclosure is provided with the separator for electric storage devices of the present disclosure. The electric storage device of the present disclosure includes a positive electrode and a negative electrode, and the separator for electric storage devices of the present disclosure is preferably arranged between the positive electrode and the negative electrode. Since a dendrite generated in an electric storage device grows through pores on the surface of a separator and has a high penetrating force to the positive electrode side surface, a microporous layer (A) with relatively high melt tension and small pore diameter can be arranged on the surface of the separator and the growth of dendrites in the separator can be effectively suppressed, resulting in a tendency to effectively suppress dendrite short circuits.

Examples of the electric storage device include, but are not limited to, a lithium secondary battery (including an all-solid-state lithium battery, a lithium sulfur battery, and a lithium air battery), a lithium-ion secondary battery, a sodium secondary battery, a sodium ion secondary battery, a magnesium secondary battery, a magnesium ion secondary battery, a calcium secondary battery, a calcium ion secondary battery, an aluminum secondary battery, an aluminum ion secondary battery, a nickel metal hydride battery, a nickel cadmium battery, an electric double-layer capacitor, a lithium-ion capacitor, a redox flow battery, and a zinc-air battery. Among these, from the viewpoint of high energy density, low cost, and durability, a lithium secondary battery, a lithium-ion secondary battery, or a lithium-ion capacitor is preferable, and a lithium-ion secondary battery is more preferable.

For example, an electric storage device can be prepared by overlapping a positive electrode and a negative electrode via the separator described above and winding them if necessary to form a layered electrode body or a wound electrode body, then loading the body into an outer packaging body, connecting the positive and negative electrodes to the positive and negative electrode terminals of the outer packaging body via leads or the like, and further, sealing the outer packaging body after injecting a non-aqueous electrolytic solution containing a non-aqueous solvent such as chain or cyclic carbonate and an electrolyte such as lithium salt into the outer packaging body.

The present electric storage device is more preferably a lithium-ion secondary battery, and herein, a preferable aspect of the lithium-ion secondary battery is described.

A positive electrode is not particularly limited as long as the positive electrode acts as a positive electrode of a lithium-ion secondary battery, and any known positive electrode can be used. A positive electrode preferably contains one or more materials selected from the group consisting of materials capable of absorbing and releasing lithium ions as a positive electrode active material. From the viewpoints of battery capacity and safety, preferable examples of the positive electrode include a lithium cobalt oxide represented by $LiCoO_2$, a spinel lithium manganese oxide represented by $Li_2Mn_2O_4$, a spinel lithium nickel manganese oxide represented by $Li_2Mn_{1.5}Ni_{0.5}O_4$, a lithium nickel oxide represented by $LiNiO_2$, a lithium-containing composite metal oxide represented by $LiMO_2$ (M indicates two or more elements selected from the group consisting of Ni, Mn, Co, Al, and Mg), and a lithium iron phosphate compound represented by $LiFePO_4$. Among these, from the viewpoint of high safety and long-term stability, more preferable examples thereof include a lithium cobalt oxide represented by $LiCoO_2$, a lithium nickel oxide represented by $LiNiO_2$, a lithium-containing composite metal oxide represented by $LiMO_2$ (M represents two or more elements selected from the group consisting of Ni, Mn, Co, Al. and Mg), and a lithium iron phosphate compound represented by $LiFePO_4$, and particularly preferably a lithium iron phosphate compound represented by $LiFePO_4$.

A negative electrode is not particularly limited as long as the negative electrode acts as a negative electrode of a lithium-ion secondary battery, and may be any known negative electrode. A negative electrode preferably contains one or more materials selected from the group consisting of a material capable of absorbing and releasing lithium ions and metal lithium as a negative electrode active material. In other words, a negative electrode preferably contains one or more materials selected from the group consisting of metal lithium, a carbon material, a material containing an element capable of forming an alloy with lithium, and a lithium-containing compound as a negative electrode active material. Examples of such a material include, in addition to metal lithium, a carbon material represented by hard carbon, soft carbon, artificial graphite, natural graphite, graphite, pyrolytic carbon, coke, glassy carbon, a calcined organic polymer compound, a mesocarbon microbead, carbon fiber, activated carbon, graphite, carbon colloids, or carbon black.

EXAMPLES

<<Measurement and Evaluation Method>>
[Measurement of Melt Flow Rate (MFR)]

The melt flow rate (MFR) of a microporous layer (A) was measured under the conditions of 230° C. and 2.16 kg load (unit is g/10 min) in accordance with JIS K 7210. The MFR of polypropylene was measured under the conditions of 230° C. and 2.16 kg load in accordance with JIS K 7210. The melt flow rate (MFR) of polyethylene was measured under the conditions of 230° C. and 2.16 kg load in accordance with JIS K 7210.

[Measurement of Mw and Mn by GPC (Gel Permeation Chromatography)]

A calibration curve was prepared by measuring standard polystyrene using Agilent PL-GPC 220 under the following conditions. A chromatograph was obtained by measuring a sample polymer under similar conditions, and based on the calibration curve, the weight average molecular weight (Mw), the number average molecular weight (Mn), and the value (Mw/Mn), which is the weight average molecular weight (Mw) divided by the number average molecular weight (Mn) of the polymer in terms of polystyrene, were calculated according to the following conditions.

Column: TSKgel GMHHR-H (20) HT (7.8 mm I.D.×30 cm)×2

Mobile phase: 1,2,4-Trichlorobenzene

Detector: RI

Column temperature: 160° C.

Sample concentration: 1 mg/ml

Calibration curve: Polystyrene

[Measurement of Melt Tension]

The melt tension (mN) of a microporous film was measured using a capillograph manufactured by Toyo Seiki Seisaku-sho, Ltd. under the following conditions.

Capillary: 1.0 mm in diameter and 20 mm in length

Cylinder extrusion speed: 2 mm/min

Drawing speed: 60 m/min.

Temperature: 230° C.

[Measurement of Pentad Fraction]

The pentad fraction of polypropylene was calculated by the peak height method from 13C-NMR spectra attributed according to the description in Polymer Analysis Handbook (edited by the Japanese Society for Analytical Chemistry). The $^{13}$C-NMR spectrum was measured by dissolving polypropylene pellets in o-dichlorobenzene-d using JEOL-ECZ500, at a measurement temperature of 145° C. and a number of scans of 25,000.

[Measurement of Tensile Modulus and Tensile Breaking Stress]

A resin composition constituting a separator was melt-kneaded using a twin-screw extruder HK-25D (manufactured by Parker Corporation, L/D=41). In order to suppress decomposition and denaturation of the resin as much as possible, the area from a resin feed hopper opening to a raw material tank was completely sealed and nitrogen flowed continuously from the bottom of the hopper to control oxygen concentration near the raw material feed opening to less than 50 ppm. All vents are completely sealed to eliminate air leakage into a cylinder. This reduction in oxygen concentration considerably suppressed the decomposition and denaturation of the polymer even at high temperatures. After melt-kneading, strands were pulled from a die (two holes) and cooled in a water-cooled bath, then cut using a pelletizer to obtain pellets. Then, a small electric injection molding machine (manufactured by Sumitomo Heavy Industries, SEI8DUZ) was used to prepare a test piece shape in accordance with tensile test piece JIS K 7161-2, 5 A/t2 mm. The tensile modulus (MPa) and tensile breaking stress (MPa) of a microporous film were then measured using an Instron Model 5966 universal material testing machine under the following conditions in accordance with JIS K 7161-2.

Tensile test piece JIS K 7161-2

Test temperature 23° C.

Test speed 0.5 mm/min (up to 0.3% strain)→100 mm/min

Distance between mark lines 20 mm

Distance between chucks 48 mm

[Measurement of Thickness (μm)]

The thickness (μm) of a separator substrate was measured at room temperature of 23±2° C. using the Digimatic Indicator IDC112 manufactured by Mitutoyo Corporation. The thickness of each microporous layer was calculated from an image data by sectional SEM obtained by the evaluation method of area-averaged long pore diameter described below.

[Measurement of Porosity (%)]

A sample with dimensions of 10 cm×10 cm square was cut from a separator or a microporous layer, the volume (cm$^3$) and the weight (g) were determined, and from them and the density (g/cm$^3$), the porosity was calculated using the following formula.

$$porosity\ (\%)=(volume-weight/density)/volume\times100$$

[Permeability (Seconds/100 cm$^3$)]

The air permeability of a separator substrate was measured using a Gurley permeability meter in accordance with JIS P-8117 (seconds/100 cm$^3$), and was divided by the thickness and then multiplied by 16, thereby calculating the permeability in terms of a thickness of 16 μm.

[Permeability after High Temperature Treatment (Seconds/100 cm$^3$)]

A sample obtained by cutting a separator substrate into a square of 100 mm in each MD/TD was placed in a hot-air dryer (manufactured by Yamato Scientific co., ltd., DF1032) and thermally treated at 140° C. for 30 minutes at normal pressure in the atmosphere. The sample was removed from the hot-air dryer, cooled at 25° C. for 10 minutes, and then the air permeability of the separator substrate (seconds/100 cm$^3$) was measured using a Gurley permeability meter in accordance with JIS P-8117, and was divided by the thickness and then multiplied by 16, thereby calculating the permeability after high temperature treatment (in terms of a thickness of 16 μm).

[TD Thermal Shrinkage Rate (%)]

A sample obtained by cutting a separator substrate into a square of 50 mm in each MD/TD was placed on copy paper in a hot-air dryer (manufactured by Yamato Scientific co., ltd., DF1032) and thermally treated at 150° C. for 1 hour under normal pressure in the atmosphere.

The sample was removed from the hot-air dryer, cooled at 25° C. for 10 minutes, and then the dimensional shrinkage was determined.

$$thermal\ shrinkage\ rate\ (\%)=(dimensions\ before\ heating\ (mm)-dimensions\ after\ heating\ (mm))/(dimensions\ before\ heating\ (mm))\times100$$

[Puncture Strength]

A needle with a hemispherical tip of 0.5 mm radius was prepared, and a separator was placed between two plates with an opening of 11 mm in diameter (dia.), and the needle, the separator and the plates were set. A puncture test was performed using "MX2-50N" manufactured by IMADA Co., Ltd. under the conditions of a radius of curvature of 0.5 mm at the tip of the needle, a diameter of 11 mm at an opening of a separator holding plate, and a puncture speed of 25 mm/minute. The needle and the separator were brought into contact, and the maximum puncture load (or puncture strength (gf)) was measured. The puncture strength (gf) was divided by the separator thickness (μm) and multiplied by 16 μm to obtain the puncture strength (gf/16 μm) when the thickness of the separator substrate was converted to 16 μm.

[Area-Averaged Long Pore Diameter (Nm)]

The area-averaged long pore diameter was measured by image analysis of sectional SEM observations. As a pretreatment, ruthenium staining was performed on a separator, and a sectional sample was prepared by freeze-fractionation. The section is the ND-MD plane. The sectional sample was fixed to an SEM sample stand for sectional observation using conductive adhesive (carbon-based), dried, and then coated with osmium using Osmium Coater (HPC-30W, manufactured by Vacuum Device Inc.) as a conductive treatment at an applied voltage adjustment knob setting of 4.5 and a discharge time of 0.5 seconds, thereby obtaining a sample for microscopy.

Next, using a scanning electron microscope (manufactured by Hitachi High-Technologies Corporation, S-4800), any three points on the surface of a microporous film were observed under the conditions of an acceleration voltage of 1 kV, a detection signal LA10, a working distance of 5 mm, and a magnification of 5,000 times.

The observed image was binarized using the Otsu method with ImageJ image processing software to separate a resin portion from a pore portion, and the average length diameter of the pore portion was calculated. Pores with an area of 0.001 nm2 or less that straddled an imaging region and outside the imaging region were excluded from the measurement. The average diameter was calculated from the area of each pore by area averaging.

[Battery Performance (Dendrite Short Circuit Evaluation)]

As the electrolytic solution, an electrolytic solution containing 1 mol/L of LiPF$_6$ as a lithium salt in a mixture of ethylene carbonate and ethyl methyl carbonate at a volume ratio of 1:2 was used.

A mixture of lithium nickel manganese cobalt mixed oxide (LiNi$_{0.5}$Co$_{0.2}$Mn$_{0.3}$O$_2$) as a positive electrode active material, carbon black powder (manufactured by Timcal Corporation, product name: SuperP Li) as a conductivity aid, and PVDF as a binder in the weight ratio of mixed oxide: conductivity aid:binder=100:3.5:3 was applied to both sides of an aluminum foil as a positive electrode current collector with a thickness of 15 μm, dried, and pressed with a roll press to produce a both-side-coated positive electrode.

A mixture of graphite powder with a particle diameter of 22 μm (D50) (manufactured by Hitachi Chemical Company, product name: MAG) and binder (manufactured by ZEON Corporation, product name: BM400B) as a negative electrode active material and carboxymethylcellulose (manufactured by Daicel Corporation, product name: #2200) as a thickener in the weight ratio of graphite powder:binder: thickener=100:1.5:1.1 was applied to one side or both sides of a 10 μm thick copper foil as a negative electrode current collector, the solvent was dried and removed, and then the coated copper foil was pressed with a roll press to produce a single-side-coated negative electrode and a double-side-coated negative electrode, respectively.

The obtained positive electrode and negative electrode were layered in the order of single-side-coated negative electrode/double-side-coated positive electrode/double-side-coated negative electrode/double-side-coated positive electrode/single-side-coated negative electrode, with a separator prepared as described below sandwiched between the opposite sides of the respective active materials. The microporous layer (A) was arranged facing a negative electrode. The resulting layered body was then inserted into a bag (battery outer packaging) composed of a laminated film made of aluminum foil (40 μm thick) coated on both sides with a resin layer, with the terminals of the positive and negative electrodes protruding from the bag. The sheet-type lithium-ion secondary battery was then prepared by injecting 0.8 mL of the electrolytic solution prepared as described above into the bag and vacuum-sealing the bag.

The obtained sheet-type lithium-ion secondary battery was housed in a thermostatic chamber (manufactured by Futaba Kagaku Co., Ltd., product name: PLM-73S) set at 25° C., connected to a charge/discharge device (manufactured by Aska Electronics Corporation, product name: ACD-01), and allowed to stand for 16 hours. The battery was then initially charged and discharged by repeating a charge/discharge cycle of charging at a constant current of 0.05 C, charging at a constant voltage of 4.35V for 2 hours after the voltage reached 4.35V, and then discharging at a constant current of 0.2 C to 3.0 V three times, 1 C refers to the current value at which the entire capacity of the battery is discharged in one hour.

After the initial charge/discharge, the battery was placed in a thermostatic chamber set at 10° C., and the battery was subjected to a charge/discharge cycle of charging at a constant current of 1 C, charging at a constant voltage of 4.50V for 1 hour after the voltage reached 4.50V, then allowing the battery to stand still in an open circuit state for 1 hour, and then discharging to 3.0V at a constant current of 1 C, repeated 10 times, and the occurrence of dendrite short circuit was checked using 10 sheet-type lithium-ion secondary batteries each during this period, and the acceptance rate (%) was calculated from the number of sheet-type lithium-ion secondary batteries out of 10 in which no short circuits occurred. Here, the presence or absence of a dendrite short circuit was determined in such a manner that a dendrite short circuit occurred when the voltage dropped by 0.3 V or more while the battery was left standing in an open circuit state after the end of charging, or when the battery was unable to be charged to 4.5 V within 2 hours during 1 C constant-current charging.

Example 1

[Preparation of Microporous Layer]

As the resin for the microporous layer (A), 100% by weight of a high molecular weight isotactic polypropylene resin (MFR (230° C.)=0.91 g/10 min, density=0.91 g/cm$^3$) was melted in a 2.5-inch extruder and fed using a gear pump to both outer layers of a two-type, three-layer co-extrusion T-die. As the resin for the microporous layer (B), 95% by weight of a high molecular weight isotactic polypropylene resin (MFR (230° C.)=0.51 g/10 min, density=0.91 g/cm$^3$) and 5% by weight of a low crystallinity polypropylene (low crystallinity PP in the Table) (MFR (230° C.)=50, tensile modulus 80 MPa) were mixed by dry blending to obtain a resin material. The obtained resin material was melted in a 2.5-inch extruder and fed using a gear pump to the inner layer of the two-type, three-layer co-extrusion T-die. The temperature of the T-die was set at 240° C., and after the molten polymer was discharged from the T-die, a precursor sheet having an A/B/A layer structure with a thickness of about 14 μm was obtained by winding the discharged resin on a roll while cooling the discharged resin with blown air. Here, the TD lip width of the T-die was set at 500 mm, the distance between the lips of the T-die (lip clearance) was set at 2.4 mm, and discharge was performed under the condition of 6 kg/h discharge rate.

The obtained precursor was then placed in a dryer and annealed at 150° C. for 180 minutes. The annealed precursor was then cold-drawn by 30% at room temperature, placed in an oven at 140° C. without shrinkage of the drawn film, hot-drawn to 180%, and then relaxed by 30% to obtain a separator substrate having a three-layer structure composed of A/B/A layers. The structure, physical properties, and battery performance evaluation results of the obtained separator substrate are shown in Table 1.

Examples 2 to 7, Comparative Examples 1, 2

A microporous film was obtained according to the same method as in Example 1, except that the raw materials were changed as shown in Table 1, and the obtained separator was evaluated.

Example 8

A microporous film was obtained using raw materials shown in Table 1 in the same manner as in Example 1 except that a two-type, two-layer co-extrusion T-die was used, and the obtained separator was evaluated.

Example 9

A microporous film was obtained using raw materials shown in Table 1 in the same manner as in Example 1, except that the microporous layer (B) was arranged on the outer layer and the microporous layer (A) was arranged on the inner layer, and the obtained separator was evaluated.

Comparative Example 4

As the resin for the microporous layer (A), 100% by weight of a high molecular weight isotactic polypropylene resin (MFR (230° C.)=0.91 g/10 min, density=0.91 g/cm$^3$) was melted in a 2.5-inch extruder and fed into a single layer T-die using a gear pump. The temperature of the T-die was set at 240° C., and after the molten polymer was discharged from the T-die, a precursor sheet of the microporous layer (A) with a thickness of about 5 μm was obtained by winding the discharged resin on a roll while cooling the discharged resin with blown air. Here, the TD lip width of the T-die was set at 500 mm, the distance between the lips of the T-die (lip clearance) was set at 2.4 mm, and discharge was performed under the condition of 6 kg/h discharge rate.

As the resin of the microporous layer (B), 100% by weight of a polyethylene resin (MFR (230° C.)=1.5 g/10 min, density=0.96 g/cm$^3$) was melted in a 2.5-inch extruder and fed into a single layer T-die using a gear pump. The temperature of the T-die was set at 210° C., and after the molten polymer was discharged from the T-die, a precursor sheet of the microporous layer (B) with a thickness of about 5 μm was obtained by winding the discharged resin on a roll while cooling the discharged resin with blown air. Here, the TD lip width of the T-die was set at 500 mm, the distance between the lips of the T-die (lip clearance) was set at 2.4 mm, and discharge was performed under the condition of 6 kg/h discharge rate.

Then, lamination was performed at 120° C. to obtain a three-layered precursor sheet having a three-layer structure of microporous layer (A)/microporous layer (B)/microporous layer (A). The obtained precursor was then placed in a dryer and annealed at 120° C. for 180 minutes. The annealed precursor was then cold-drawn by 20% at room temperature, placed in an oven at 140° C. without shrinkage of the drawn film, hot-drawn to 180%, and then relaxed by 30% to obtain a separator substrate having a three-layer structure composed of A/B/A layers. The structure, physical properties, and battery performance evaluation results of the obtained separator substrate are shown in Table 1.

TABLE 1

| | | Example 1 | Example 2 | Example 3 | Example 4 | Example 5 | Example 6 | Example 7 | Example 8 |
|---|---|---|---|---|---|---|---|---|---|
| Structure of separator substrate | | A/B/A | A/B/A | A/B/A | A/B/A | A/B/A | A/B/A | A/B/A | A/B |
| Microporous layer (A) | Composition | PP | PP | PP | PP | PP | PP | PP | PP |
| | MFR (g/10 min, 230° C.) | 0.91 | 0.31 | 0.91 | 0.91 | 0.91 | 0.91 | 0.91 | 0.91 |
| | Mw of PP | 810000 | 940000 | 810000 | 810000 | 810000 | 810000 | 810000 | 810000 |
| | MWD of PP | 5.4 | 13 | 5.4 | 5.4 | 5.4 | 5.4 | 5.4 | 5.4 |
| | Thickness (μm) | 4.4 | 4.5 | 4.5 | 4.3 | 4.5 | 4.3 | 4.7 | 4.6 |
| | Area-averaged long pore diameter (nm) | 180 | 175 | 188 | 190 | 178 | 186 | 181 | 182 |
| Microporous layer (B) | Composition *polyolefin + thermoplastic resin (Z) | PP + 5% low crystallinity PP | PP + 5% SEPS(1) | PP + 10% SEPS(1) | PP + 5% C2/C4 elastomer | PP + 5% C2/C8 elastomer | PP + 10% low crystallinity PP | PP + 8% C3/C4 elastomer (1) | PP + 5% C3/C4 elastomer (2) |
| | MFR (g/10 min, 230° C.) | 0.51 | 0.51 | 0.51 | 0.51 | 0.51 | 0.51 | 0.51 | 0.51 |
| | Mw of PP | 810000 | 810000 | 810000 | 810000 | 810000 | 810000 | 810000 | 810000 |
| | MWD of PP | 4.4 | 4.4 | 4.4 | 4.4 | 4.4 | 4.4 | 4.4 | 4.4 |
| | MFR of thermoplastic resin (Z) (g/10 min. 230° C.) | 50 | 5 | 5 | 6.7 | 11 | 50 | 7 | 7 |
| | Tensile modulus of thermoplastic resin (Z) (MPa) | 80 | 82 | 82 | 45 | 17 | 80 | 160 | 221 |
| | Tensile breaking stress of resin composition (MPa) | 24.2 | 20.8 | 19.8 | 22.9 | 22.6 | 19.0 | 27.0 | 28.0 |
| | Thickness (μm) | 4.4 | 4.5 | 4.5 | 4.3 | 4.5 | 6.6 | 4.7 | 4.6 |
| | Area-averaged long pore diameter (nm) | 262 | 286 | 279 | 258 | 233 | 272 | 220 | 210 |
| | pore diameter ratio of (B) layer/(A) layer | 1.46 | 1.63 | 1.48 | 1.36 | 1.31 | 1.46 | 1.22 | 1.16 |
| Separator | Thickness (μm) | 13.3 | 13.7 | 13.5 | 12.9 | 13.7 | 13.1 | 14.1 | 13.8 |
| | Porosity | 41.7% | 44.8% | 43.2% | 43.4% | 44.7% | 41.1% | 43.2% | 43.7% |
| | Permeability (sec) | 243 | 224 | 255 | 237 | 231 | 320 | 220 | 245 |
| | TD thermal shrinkage rate | 0.1% | 0.1% | 0.1% | 0.0% | 0.2% | 0.1% | 0.2% | 0.2% |
| | Puncture strength (gf) | 221 | 251 | 253 | 262 | 236 | 233 | 239 | 263 |
| | Puncture strength (gf/16μ) | 266 | 293 | 300 | 325 | 275 | 285 | 271 | 305 |
| | Permeability after high temperature treatment (sec) | 246 | 225 | 257 | 240 | 235 | 324 | 224 | 249 |
| Battery performance | Dendrite short circuit evaluation (acceptance %) | 90% | 100% | 90% | 90% | 80% | 90% | 80% | 80% |

| | | Example 9 | Comparative Example 1 | Comparative Example 2 | Comparative Example 3 | Comparative Example 4 |
|---|---|---|---|---|---|---|
| Structure of separator substrate | | B/A/B | A/B/A | A/B/A | A/B/A | A/B/A |
| Microporous layer (A) | Composition | PP | PP | PP | PP | PP |
| | MFR (g/10 min, 230° C.) | 0.91 | 0.51 | 0.51 | 0.51 | 0.91 |
| | Mw of PP | 810000 | 810000 | 810000 | 810000 | 690000 |
| | MWD of PP | 5.4 | 4.4 | 4.4 | 4.4 | 5.4 |
| | Thickness (μm) | 4.5 | 4.2 | 4.4 | 5.0 | 4.2 |

TABLE 1-continued

| | | | | | | |
|---|---|---|---|---|---|---|
| | Area-averaged long pore diameter (nm) | 209 | 234 | 204 | 190 | 242 |
| Microporous layer (B) | Composition *polyolefin + thermoplastic resin (Z) | PP + CEBC | PP | PP + 5% long chain branched PP | PP+ hydrogenated SEBS | PE |
| | MFR (g/10 min, 230° C.) | 0.51 | 0.51 | 0.51 | 0.51 | 1.5 |
| | Mw of PP | 810000 | 810000 | 810000 | 810000 | — |
| | MWD of PP | 4.4 | 4.4 | 4.4 | 4.4 | — |
| | MFR of thermoplastic resin (Z) (g/10 min. 230° C.) | 2.5 | — | 1 | 1.5 | — |
| | Tensile modulus of thermoplastic resin (Z) (MPa) | 5 | — | 2307 | 1350 | — |
| | Tensile breaking stress of resin composition (MPa) | 15.6 | 33.5 | 33.2 | 32.5 | 30 |
| | Thickness (μm) | 4.5 | 4.2 | 4.4 | 5.0 | 4.2 |
| | Area-averaged long pore diameter (nm) | 242 | 238 | 205 | 200 | 557 |
| | pore diameter ratio of (B) layer/(A) layrer | 1.16 | 1.02 | 1.00 | 1.05 | 2.30 |
| Separator | Thickness (μm) | 13.7 | 12.6 | 13.2 | 15.1 | 12.8 |
| | Porosity | 44.1% | 53.4% | 48.4% | 46.2% | 54.8% |
| | Permeability (sec) | 222 | 191 | 244 | 259 | 178 |
| | TD thermal shrinkage rate | 0.2% | 0.2% | 0.2% | 0.2% | 0.3% |
| | Puncture strength (gf) | 252 | 228 | 223 | 218 | 198 |
| | Puncture strength (gf/16μ) | 294 | 290 | 270 | 231 | 248 |
| | Permeability after high temperature treatment (sec) | 224 | 193 | 246 | 261 | >1000 |
| Battery performance | Dendrite short circuit evaluation (acceptance %) | 80% | 40% | 40% | 30% | 60% |

INDUSTRIAL APPLICABILITY

The separator for electric storage devices of the present disclosure can be suitably used as a separator for electric storage devices, for example, lithium-ion secondary batteries.

The invention claimed is:

1. A separator for electric storage devices comprising:
(A) a microporous layer containing 90 wt % or more of (X) isotactic polypropylene; and
(B) a microporous layer containing 85 wt % or more of (Y) isotactic polypropylene identical or different from the isotactic polypropylene (X), and (Z) thermoplastic resin different from the isotactic polypropylene (Y), wherein the microporous layer (B) has a lower isotactic polypropylene content than the microporous layer (A), and the thermoplastic resin (Z) has a tensile modulus of from 3 MPa to 500 MPa.

2. The separator for electric storage devices according to claim 1, wherein the thermoplastic resin (Z) has a tensile modulus of from 10 MPa to 200 MPa.

3. The separator for electric storage devices according to claim 1, wherein the composition forming the microporous layer (B) has a tensile breaking stress of from 14 MPa to 30 MPa.

4. The separator for electric storage devices of claim 1, wherein the separator for electric storage devices, when converted to a thickness of 16 μm, has a permeability of from 50 sec/100 cm$^3$ to 300 sec/100 cm$^3$.

5. The separator for electric storage devices according to claim 1, wherein an area-averaged long pore diameter of pores present in the microporous layer (B) in an ND-MD sectional observation of the microporous layer (B) is from 100 nm to 600 nm.

6. The separator for electric storage devices according to claim 1, wherein the microporous layer (A) has a melt flow rate (MFR) of 0.9 g/10 min or less.

7. The separator for electric storage devices according to claim 1, wherein at least one layer of the microporous layer (A) and at least one layer of the microporous layer (B) are adjacent to each other.

8. The separator for electric storage devices according to claim 1, wherein the separator comprises the microporous layer (A) on the outermost layer of both sides thereof.

9. An electric storage device comprising a positive electrode, a negative electrode, and the separator for electric storage devices according to claim 1 arranged between the positive electrode and the negative electrode.

10. The electric storage device according to claim 9, wherein the positive electrode contains lithium iron phosphate as a positive electrode active material.

\* \* \* \* \*